United States Patent [19]

Aidlin et al.

[11] 4,384,907
[45] May 24, 1983

[54] APPARATUS, METHOD, AND RETROFIT KIT FOR APPLYING A BONDING AGENT TO A CUP

[75] Inventors: Stephen H. Aidlin; Roy D. Styers, both of Sarasota, Fla.

[73] Assignee: Aidlin Automation Corp., Sarasota, Fla.

[21] Appl. No.: 331,547

[22] Filed: Dec. 17, 1981

[51] Int. Cl.³ .............................................. B65C 9/00
[52] U.S. Cl. ..................................... 156/86; 118/318; 118/319; 118/320; 156/556; 156/567
[58] Field of Search ....................... 156/556, 566–568, 156/86; 118/318–320; 425/809; 493/102, 105–109; 53/308

[56] References Cited

U.S. PATENT DOCUMENTS

| 2,322,812 | 6/1943 | Barnes et al. | 53/308 X |
| 3,452,709 | 7/1969 | Hartmeister | 118/319 X |
| 3,977,358 | 8/1976 | Stroobants | 118/319 X |
| 4,132,584 | 1/1979 | Aidlin et al. | 156/500 |
| 4,247,357 | 1/1981 | Konty | 156/567 |
| 4,300,966 | 11/1981 | Hoffmann | 156/567 X |

Primary Examiner—David A. Simmons
Attorney, Agent, or Firm—Erwin S. Teltscher; Allison C. Collard; Thomas M. Galgano

[57] ABSTRACT

In a machine and method for producing plastic bottles by periodically applying a bonding agent to a cup of a series of cups adapted for successive bonding operations of each cup to respective round-bottomed hollow bodies of plastic material, and including an applicator station for applying the bonding agent to a surface of a cup, a conveyor movable in a transport direction for receiving and moving the cups, an arresting device for temporarily arresting the cup movement near the applicator station, a rotatable transporter provided with seats for the cups and with holders for the bottles above the seats, and an extraction device for removing successive bottles from the transporter, the combination of, or retrofit kit, including a drive arranged to be intermittently coupled to the arrested cup for imparting a rotating movement to the cup, and a coupler for coupling and uncoupling the drive to the arrested cup, wherein the applicator station is arranged to apply the bonding agent to the surface of the rotating cup.

14 Claims, 7 Drawing Figures

APPARATUS, METHOD, AND RETROFIT KIT FOR APPLYING A BONDING AGENT TO A CUP

REFERENCE TO COPENDING APPLICATIONS

Reference should additionally be had to copending applications entitled "Feed System for Plastic Bottles" and "Improvements in Machine for Manufacturing Flat-bottomed Bottles" filed concurrently with the instant application.

BACKGROUND OF THE INVENTION

In a machine for manufacturing plastic bottles by fitting round-bottomed bodies of plastic material to flat-bottomed base cups of similar material, it is required to coat a surface of the base cups with a bonding agent for subsequent bonding of the cup to one of the round-bottomed hollow bodies, the combined assembly of the hollow body and a corresponding base cup forming the bottle.

In the prior art, taught, for example, in U.S. Pat. No. 4,132,584, issued to Aidlin et al, an applicator disposed above a temporarily arrested cup, and wherein the cup normally moves on a conveyor, applies a liquid bonding agent to the stationary cup. The cup resumes its movement following application thereto of the bonding agent.

The above-described method has the distinct disadvantage that the bonding agent is not applied uniformly to the stationary cup, resulting in poor bonding of the finished bottle.

SUMMARY OF THE INVENTION

It is accordingly one of the principal objects of the present invention to obviate the disadvantages of the prior art, and to apply a bonding agent to the surface of a cup as uniformly as possible, in order to create a strong bond.

This object is attained by providing in a machine for manufacturing plastic bottles through the periodic application of a bonding agent to a cup of a series of cups adapted for subsequent successive bonding of the cups to round-bottomed hollow bodies of plastic material, an applicator station, a conveyor movable in a generally predetermined direction of movement for receiving and moving the cup, arresting means temporarily arresting the cup movement in the generally predetermined direction near the applicator station, a rotatable transporter provided with seats for the cups and with holders for the bottles above the seats, and extraction means for removing successive bottles from the transporter, a drive which may be intermittently coupled to the arrested cup for imparting a rotating movement to the cup, and a coupler for coupling and uncoupling the drive to the arrested cup. The applicator station includes an applicator device for applying the bonding agent to a surface of the rotating cup, so that at least a substantially uniform annular layer of the bonding agent may be coated on a surface of the cup for subsequent bonding of the surface to the bottom of one of the round-bottomed hollow bodies. It is advantageous if the machine includes rotatable transfer means for transferring the cup to the transporter. The drive is preferably an electric motor, and the conveyor advantageously includes a generally horizontally movable conveyor belt.

In a first version of the invention a platform is advantageously postcoupled to the conveyor and formed with an aperture. Each cup is preferably provided with engagement means, and the coupling means preferably includes moving means for periodic upward movement of the drive into engagement with the engagement means of a corresponding cup, through the aperture, and for periodic downward movement of the drive for releasing the drive from engagement with the corresponding cup, following application of the bonding agent to the surface of the corresponding cup. The coupler advantageously includes antifriction bearing means having an inner race, and the drive preferably includes a rotatable shaft having a major peripheral surface thereof normally in contact with the inner race of the bearing means.

The cup has a bottom end preferably formed with an outer groove, and the rotatable shaft has advantageously a top end generally mating with the groove.

Each cup is advantageously deformable, and the top end of the shaft is preferably arranged to mate with the outer annular groove of each cup, so as to slightly deform the cup, so that engagement of the rotatable shaft with the cup is facilitated.

The applicator device preferably includes a nozzle arranged to coat the surface of the cup for a predetermined time.

In this version of the invention the transfer means is a star-wheel which may be coupled to the transporter of the machine, which is preferably a rotor.

The machine preferably includes gate means arranged upstream of the applicator station, and which is operated in synchronism with the coupling means for periodically restraining another cup immediately upstream of the rotating cup from pressing thereagainst. The cup-movement arresting-means is advantageously a piston-cylinder mechanism.

Advantageously sensing means are provided for sensing the presence of a cup near the applicator station, and for thereafter actuating the applicator station for a predetermined time; the sensing means are preferably photoelectric means, and the actuation of the applicator station is advantageously adapted to be inhibited from an external source.

In a second version of the invention, the starwheel is arranged to cooperate with the conveyor means and the transporter, and is intermittently operable to stop in a first position for receiving successive cups, in a second position for applying the rotating movement to the received cup, and the bonding agent to the surface of the rotating cup, so as to form a coating thereon, and in a third position, for the coated cup to be transferred to the transporter.

The drive means and the starwheel preferably include holding means for holding the rotating cup in a predetermined spatial position. The holding means preferably include guide means located in the drive means, for guiding and frictionally imparting a spin to the cup, and bearing means located in the starwheel rotatably engageable with the rotating cup. The applicator means advantageously includes an intermittently actuatable nozzle, which is preferably pivotably movable between a first position above the rotatable cup and a second position remote from the rotatable cup.

The machine advantageously includes a platform for mounting the starwheel thereon, and a peripheral guide rail mounted on the platform for operatively retaining the cups temporarily on the platform within the guide rails. Advantageously, guidance means are also provided for guiding cups discharged from the starwheel to the transporter.

In a method of manufacturing plastic bottles by applying a bonding agent to a cup of a series of cups adapted for subsequent bonding of the cup to round-bottomed hollow bodies of plastic material with the aid of an applicator station, the steps include moving the cup in a general predetermined direction near the applicator station, temporarily arresting the cup movement in the general predetermined direction, imparting a rotary motion to the cup, applying the bonding agent from the applicator station to the rotating cup, stopping the rotational movement of the cup, and moving the cup coated with the bonding agent away from the applicator station to an assembly station for assembling the bottle from the cup, and from one of the round-bottomed hollow bodies.

BRIEF DESCRIPTION OF THE DRAWING

The invention will be better understood with the aid of the drawing, in which.

DESCRIPTION OF THE PREFERRED EMBODIMENTS

In what follows there will be described an improved machine for manufacturing flat-bottomed bottles, the improvement relating primarily to an apparatus and a method for applying a bonding agent to a cup used in the machine for assembling a flat-bottomed bottle from the cup and a round-bottomed hollow body, or container.

It will be understood that the scope of the present invention extends also to a kit for applying a bonding agent to a cup, which can be retrofitted to an existing machine for manufacturing flat-bottomed bottles.

Figures 1, 2:
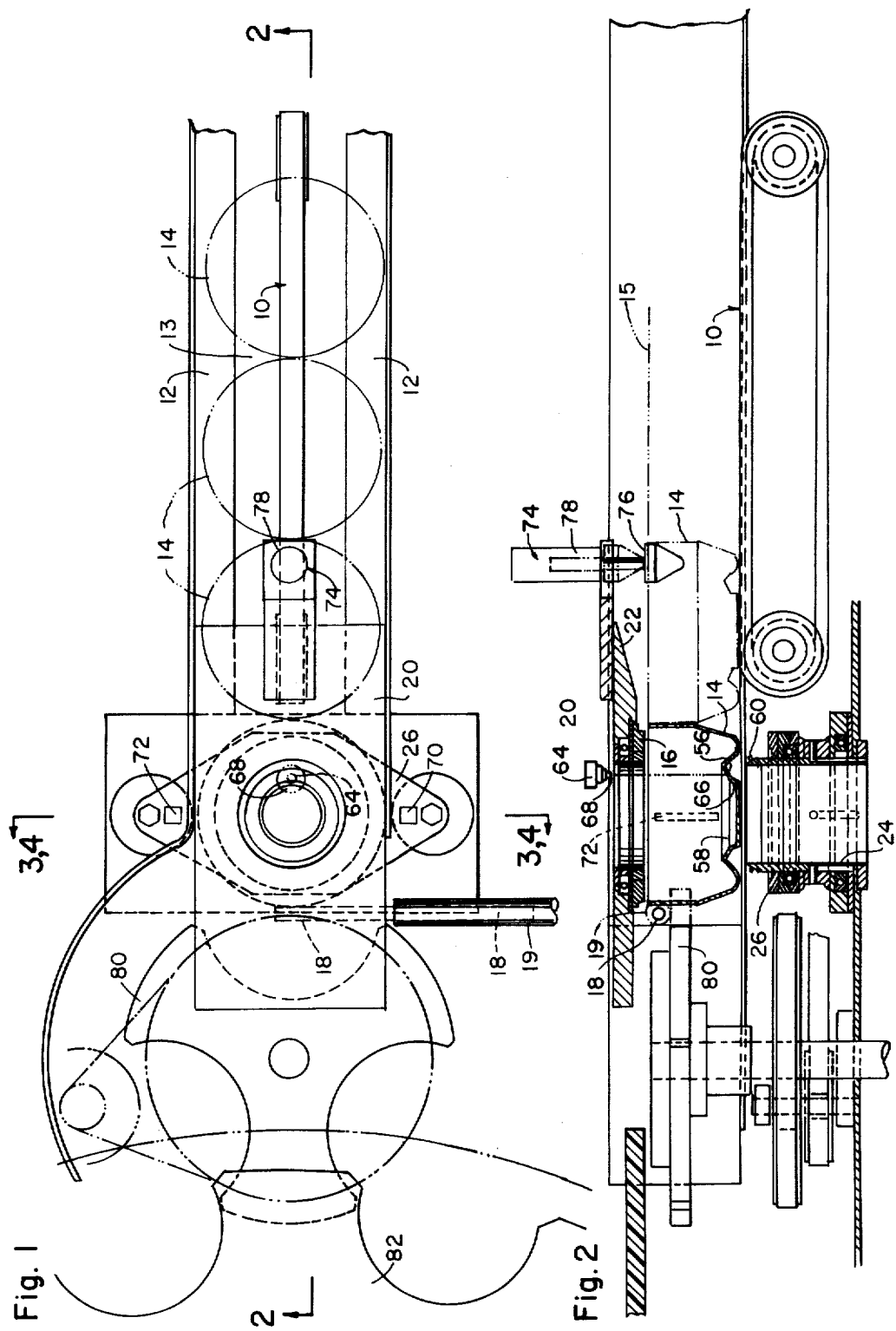
FIG. 1 is a plan view of the conveying device, applicator station, and transfer means, according to the present invention.
FIG. 2 is a sectional elevation view of the conveying device, applicator station and transfer means shown in FIG. 1, taken along the line 2—2 of FIG. 1.
Figure 3:
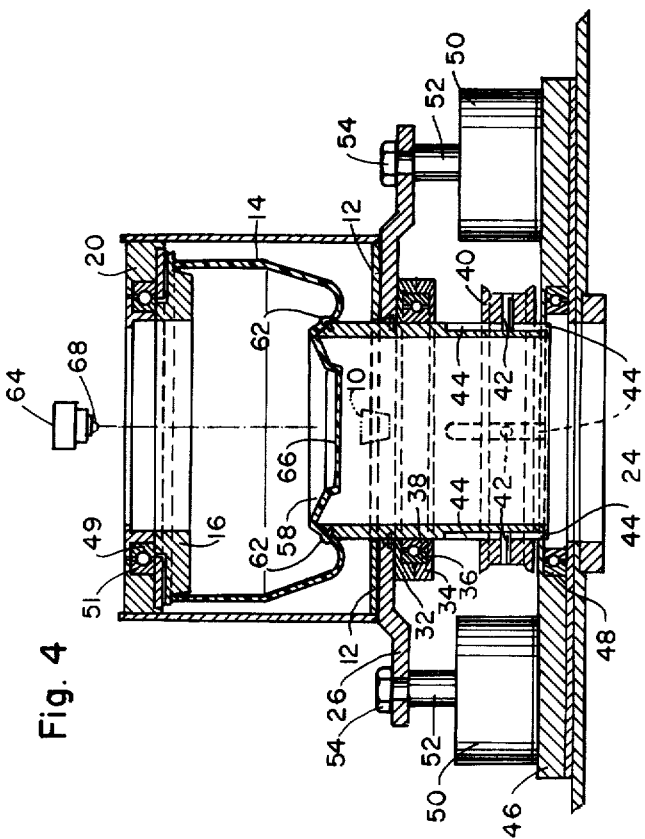
FIG. 3 is a sectional view of a detail of FIG. 1 taken along line 3—3, with the device in the lowered position.

Referring now to the drawing, conveyor means, for example, an endless conveyor belt 10, is arranged to move from right to left, as seen in FIGS. 1 and 2, towards a platform 12, which, as shown in FIG. 3, is formed with apertures 13.

The conveyor belt 10 is arranged to carry a series of cups 14, and is driven forward by drive means, such as by a non-illustrated D.C. motor. The cups 14 are carried from the belt 10 onto the platform 12, and may slip thereon. The top locus of the advancing cups 14 is shown at 15. A corresponding cup 14 may thus be arrested temporarily in the position show in FIGS. 1 and 2, immediately below a passive rotatable plate 16, by cup-movement arresting means, such as a pneumatically driven lock-out piston 18, periodically halting the movement of the normally advancing cups 14 by reciprocal movement out of a corresponding cylinder 19. The plate 16 is formed as a truncated cone for alignment with each cup 14. The non-operative position of the piston 18 is shown in dotted lines. The cups 14 are gently guided to the position shown in FIGS. 1 and 2 by means of a top guide piece 20 with a leading tapered edge 22. Below the arrested cup 14 there are disposed rotatable drive means, such as a rotatable drive cylinder 24, which is, in turn, rotatably secured within a cross-member 26 by means of a removable collet 28, and securing plates 32 and 34; within the latter there are disposed antifriction bearing means, such as a bearing 36. The cylinder 24 bears against the inner race of the bearing 36.

The cylinder 24 may be rotatably driven from a pulley 40 through four equally spaced, radially mounted roll-pins 42 protruding interiorly therefrom to engage four longitudinal grooves 44 formed on the periphery of the drive cylinder 24, so that a slidable spline drive is created between the pulley 40 and the drive cylinder 24.

In a base plate 46, which is stationary, there is mounted an anti-friction bearing means, for example a bearing 48, which provides a lower stabilization of the active drive cylinder 24.

Also the upper rotatable plate 16 is affixed to an inner race 49 of a bearing 51.

Coupling means are provided to couple the active drive cylinder 24 to an arrested cup 14, which, for stabilization purposes, is also coupled to the passive rotatable plate 16. The coupling means may consist of vertically movable moving means, for example, of solenoid means in the form of two pancake cylinders 50 with piston rods 52, affixed to the cross-member 26 by means of respective bolts 54.

Figure 4:
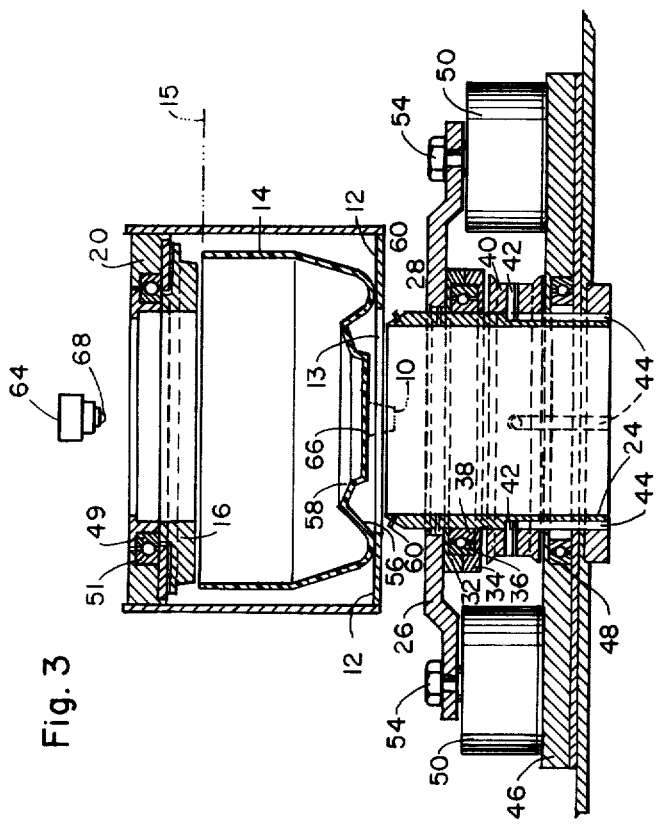
FIG. 4 is a sectional view similar to that of FIG. 3, with the device in the raised, or operational position.

When a cup 14 has come to a halt below the rotatable plate 16, and above the drive cylinder 24, the pancake cylinders 50 are energized, raising the cross-member 26, and the drive cylinder 24 for the drive cylinder 24 to engage the underside of the cup 14. As seen in the cross-sectional views of FIGS. 3 and 4, each cup 14 is formed with an annular groove or recess 56. Progressing inwardly, the recess 56 forms initially an angle of about 60° with the horizontal, with the corresponding base surface of the cup 14 being inclined upwardly, which slope is then reversed to point downwardly at an angle of about 15°, as proceeding in a radially inward direction. Thus a saucer-like annular surface 58 is formed on the top side of each cup 14; progressing further interiorly along the base surface of the cup 14, there is formed in the center thereof a flat surface 66, which is slightly raised with respect to the outer edges of the base surface of the cup 14.

The cylinder, or shaft 24 is chamfered at its upper end at an angle of approximately 60° to mate with the annular recess 56 formed in each cup 14. Four equally spaced roll-pins 60 mounted so as to substantially point radially outwardly on the cylinder 24, serve to temporarily deform the recess 56, as shown at 62 in FIG. 4, when the cylinder 24, in its upward movement, makes contact with the bottom surface of each cup 14, thereby also pressing it into engagement with the stabilizing, passive, rotatable plate 16. The temporary deformation of the cup 14 by the roll-pins 60 assures a good frictional contact between the drive cylinder 24 and each cup 14. An applicator station 64 includes a nozzle 68, from which there is sprayed a bonding agent, such as a hot melt adhesive, upon the rotating cup 14, for a predetermined time, which hot melt adhesive is particularly directed upon the surface 58 of the cup 14. The action of the applicator station 64 is initiated by a photoelectric cell sensor mechanism, consisting of a light source 70, and a photocell 72. When the light beam normally impinging on the photocell 72 is interrupted, the action of the nozzle 68 is initiated by conventional means, for example by a relay 73, by the photoelectric cell sensor mechanism. The action of the relay 73, or other equivalent nozzle-actuating mechanism, can also be arranged to be inhibited from an external source, for example, when any part of the apparatus, or machinery arranged to cooperate therewith, is malfunctioning.

To guard against a cup which follows the cup 14 being rotated at a given time, pressing against the rotating cup 14, gate means, such as a gate cylinder and piston mechanism 74, are arranged immediately upstream of the applicator station 64. The piston 76 of the cylinder and piston mechanism 74 is arranged to move downwardly and outwardly from the cylinder 78, so as to arrest the translatory movement of the preceding cup at a time just preceding the start of the rotary movement of the cup 14 currently being processed, and is arranged to move upwardly again in a direction into the cylinder 78 (shown in dotted lines) as soon as the processing of the cup 14, which had just been rotated, has been completed.

The rotation speed of the cylinder 24 is advantageously arranged to be of the order of 3000 RPM. Spraying of the adhesive takes about 1-½ seconds, and thereafter the sprayed cup 14 is conveyed to transfer means, such as a starwheel 80, which, in turn, conveys the cup further to an assembly station for assembling a bottle from a cup and a (non-illustrated) round-bottomed hollow body. The transfer means, i.e. the starwheel 80 of the assembly station is shown, to which the conveyor belt 10 conveys a cup, a surface of which has been coated with a bonding agent for subsequent bonding of the surface to the bottom of one of the round-bottomed hollow bodies.

The starwheel 80 is arranged to transfer the cups 14 to a rotor in the form of a rotatable transporter 82, which is part of the bottle-producing machine.

The bottle-producing machine, may, for example, be a machine for manufacturing flat-bottomed bottles, as described in the already cited U.S. Pat. No. 4,132,584, but without the applicator means.

In the preferred embodiment described, the following commercially available components were used; a Humphrey model 6-D-2 for the lockout cylinder and piston mechanism 18 and 19, an Eagle "A" section belt for the conveyor belt 10, a Fabco-air model D-121-X for the solenoid or pancake cylinders 50, a Scan-O-Matic model 5-322-3 A-F for the light sorce and photocell components 70 and 72, and a Humphrey model 6-D-2 for the gate cylinder and piston mechanism 74,76, and 78.

Figure 5:
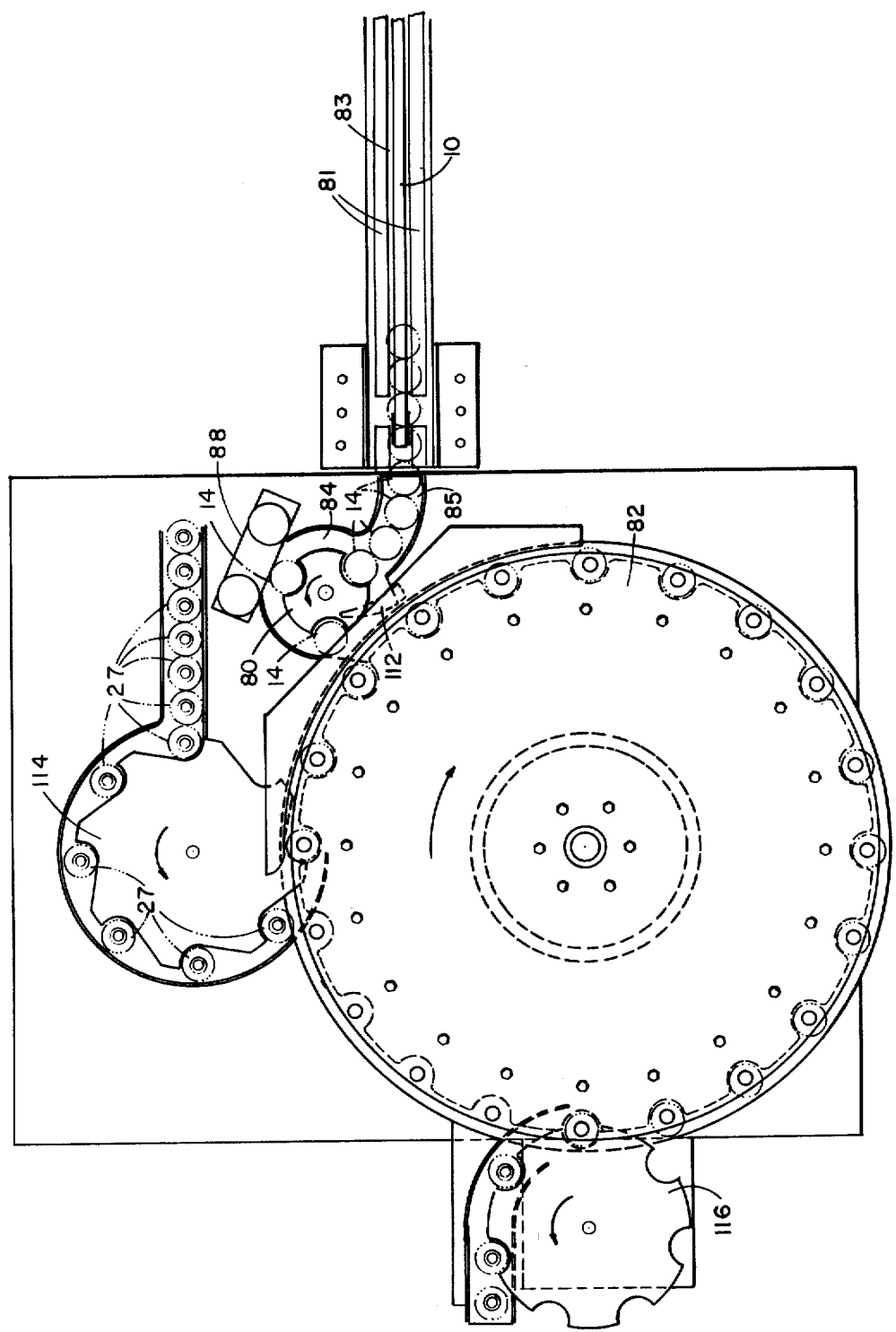
FIG. 5 is an overall plan view of the alternate version of the invention, including the conveying device, the starwheel, and the transporter.
Figure 6:
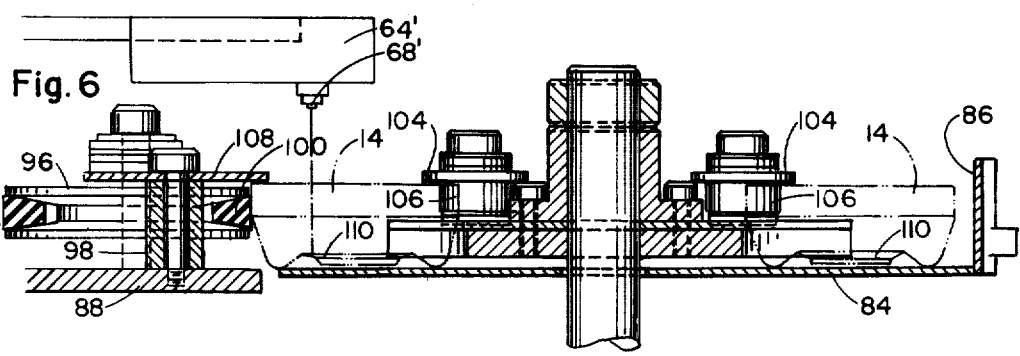
FIG. 6 is a large-scale elevation view in part section of the starwheel and the guide pulley imparting rotation to a cup.
Figure 7:
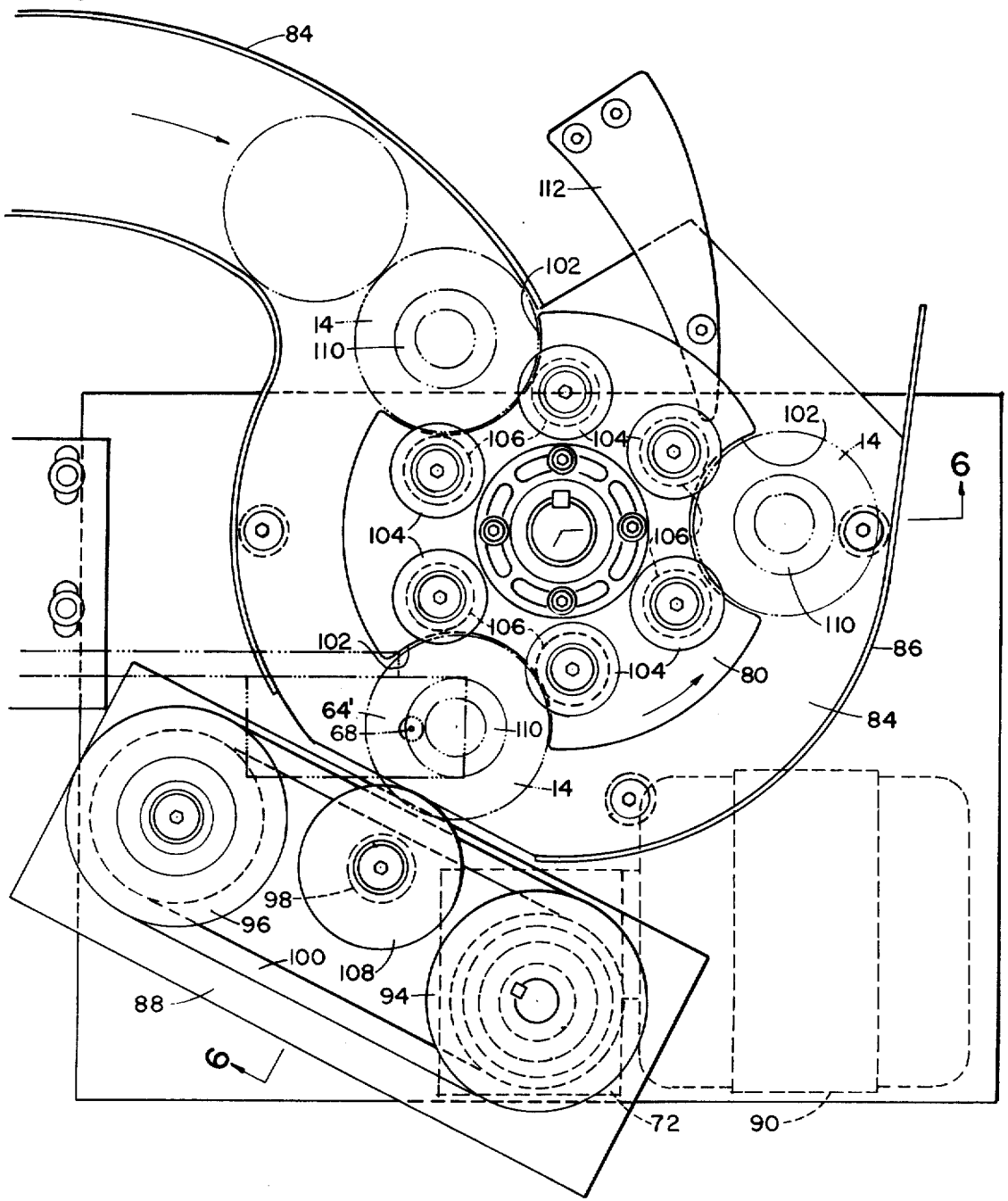
FIG. 7 is a large-scale plan view corresponding to FIG. 6.

In an alternate version of the invention, best seen in FIGS. 5,6 and 7, the conveyor belt 10, as best seen in FIG. 5, guides the advancing cups below a transport rail 81 formed with a longitudinal opening 83, via an intermediate guide channel 85 to the starwheel 80, which is mounted on a platform 84 having a peripheral guide rail 86 mounted thereon. On a side of the starwheel 80 remote from the transporter 82 there is positioned a base 88. A motor 90 mounted below the base 88 is in operative engagement, not illustrated in detail, through a gear reduction mechanism 92 with a guide pulley 94, which in turn drives an idler pulley 96 and a guide means, such as a guide pulley 98, through a belt 100.

The starwheel 80 is formed, for example, with three arcuate recesses 102, each shaped to mate with an incoming cup 14. Each recess 102 has a first position, shown in an upper left hand corner of the starwheel 80 in FIG. 7, for receiving successive cups 14, a second position, shown in a lower left hand corner of the starwheel 80 in FIG. 7, for applying a rotating movement to the cup 14, and for receiving the bonding agent on the surface of the rotating cup 14, so as to form a coating thereon, and a third position, shown in a right hand corner of the starwheel 80 in FIG. 7, for transferring the coated cup 14 to the transporter 82.

As the starwheel 80 is intermittently rotating in a counterclockwise direction, as shown by the arrow in FIG. 5, each cup 14 advances from the first or receiving position, to the second or bonding agent receiving position. In this second position, a cup-actuated (non-illustrated) relay actuates the motor 90 as soon as the cup 14 reaches the second position. Hence the respective cup 14 is imparted a spin or rotation through being positioned to be in frictional contact with the belt 100. Simultaneously the rotating cup 14 is kept in its spatial position by lips 104 of rotatable bearings 106, as best seen in FIG. 6, and by lips 108 of the guide pulley 98. At this moment the nozzle 68' of the applicator 64' releases a predetermined amount of the bonding agent, such as hot glue, onto the top surface 110 of the rotating cup 14. The applicator or hot-glue dispenser 68' can be pivotably moved between the position just above the surface 110 of a rotating cup 14 to another position out of the way, or remote from the rotating cup 14, shown dotted in FIG. 7.

Upon a further rotation of the starwheel 80 in a counterclockwise direction, the (non-illustrated) cup-actuated relay is released, thus stopping the rotation of motor 90. The coated cup, in its third, or transfer position, is then guided towards the transporter 82 by means of preferably resilient guidance means, such as guide plate 112. In the transporter 82 (shown as disks 5,6 and 7 in the previously referenced U.S. Pat. No. 4,132,584) the cups 14 are then fitted to round-bottomed hollow bodies (denoted with the reference numberal 27 in the above-referenced U.S. patent), resulting in the formation of respective bottles. The round-bottomed hollow bodies 27 can be supplied to the transporter 82 in a manner as shown in the above-referenced patent, or by means of an index wheel 114, as shown in FIG. 5. Similarly, the bottles can be extracted as shown in the above-referenced patent, or by means of an index wheel 116, cooperating with the transporter 82.

It will be further apparent that numerous variations and modifications can be made in the subject of the present invention by anyone skilled in the art, in accordance with the principles of the invention hereinabove set forth, and without the exercise of any inventive ingenuity.

We claim:

1. In a machine for producing plastic bottles by periodically applying a bonding agent to a cup of a series of cups adapted for successive bonding operations of each cup to respective round-bottomed hollow bodies of plastic material, and including applicator means for applying the bonding agent to a surface of a cup, conveyor means movable in a generally predetermined direction of movement for receiving and moving the cups, arresting means for temporarily arresting the cup movement in said generally predetermined direction near said applicator means, a rotatable transporter arranged downstream of said applicator means, said conveyor means, and said arresting means, said rotatable transporter being provided with seats for said cups and with holders for said bottles above said seats, and extraction means for removing successive bottles from said transporter, in combination:

rotatable transfer means arranged upstream of said transporter to transfer the cup to said transporter, drive means arranged adjacent said transfer means to be intermittently coupled to the arrested cup for imparting a rotating movement to the cup, following arrest of its movement in the predetermined direction, coupling means for coupling and uncoupling said drive means to the arrested cup, said applicator means being arranged to apply said bonding agent to the surface of the rotating cup, whereby at least a substantially uniform annular layer of the bonding agent may be coated on the surface of each cup for said subsequent bonding operations.

2. The machine as claimed in claim 1, wherein said drive means is an electric motor.

3. The machine as claimed in claim 1 wherein said movement is a translatory movement.

4. The machine as claimed in claim 1, wherein said transfer means is arranged to cooperate with said conveyor means and said transporter, and is intermittently operable to stop in a first position for receiving successive cups, in a second position for applying said rotating movement to the received cup, and applying the bonding agent to the surface of the rotating cup so as to form a coating thereon, and in a third position, for the coated cup to be transferred to said transporter.

5. The machine as claimed in claim 4, wherein said drive means and said transfer means comprise holding means for holding the rotating cup in a predetermined spatial position.

6. The machine as claimed in claim 5, wherein said holding means include guide means located near said drive means, for guiding and frictionally imparting a spin to said cup, and bearing means located on said transfer means rotatably engageable with the rotating cup.

7. The machine as claimed in claim 1, wherein said applicator means includes a normally stationary and intermittently actuatable nozzle.

8. The machine as claimed in claim 4, further comprising a platform for mounting said transfer means thereon, and a peripheral guide rail mounted on said platform for operatively retaining the cups temporarily on said platform within said guide rails.

9. The machine as claimed in claim 4, further comprising guidance means for guiding cups discharged from said transfer means to said transporter.

10. The machine as claimed in claim 1, wherein said applicator means includes a nozzle normally located in a first position above an operatively rotating cup, but pivotable to a second position remote from said first position.

11. The machine as claimed in claim 1, wherein said transfer means is a starwheel having a first maximum diameter, and wherein said transporter has a second maximum diameter exceeding said first maximum diameter by a factor greater than about 5.

12. A kit adapted to be retrofitted to a machine for producing plastic bottles by periodically applying a bonding agent to a cup of a series of cups adapted for successive bonding operations of each cup to respective round-bottomed hollow bodies of plastic material, and including applicator means for applying the bonding agent to a surface of a cup, conveyor means movable in a generally predetermine direction of movement for receiving and moving the cups, arresting means for temporarily arresting the cup movement in said generally predetermined direction near said applicator means, a rotatable transporter arranged downstream of said applicator means, said conveyor means, and said arresting means, said rotatable transporter being provided with seats for said cups and with holders for said bottles above said seats, and extraction means for removing successive bottles from said transporter, said kit comprising, in combination, rotatable transfer means arranged upstream of said transporter to transfer the cup to said transporter, drive means arranged adjacent said transfer means to be intermittently coupled to the arrested cup for imparting a rotating movement to the cup, following arrest of its movement in the predetermined direction, coupling means for coupling and uncoupling said drive means to the arrested cup, said applicator means being arranged to apply said bonding agent to the surface of the rotating cup, whereby at least a substantially uniform annular layer of the bonding agent may be coated on the surface of each cup for said subsequent bonding operations.

13. In a method of manufacturing plastic bottles by applying a bonding agent to a cup of a series of cups adapted for subsequent bonding of the cup to round-bottomed hollow bodies of plastic material with the aid of an applicator station, the steps comprising:

moving the cup in a general predetermined direction near said applicator station, temporarily arresting the cup movement in said general predetermined direction, imparting a rotary movement to said cup, applying the bonding agent from said applicator station to the rotating cup, stopping the rotational movement of said cup, and rotatably transferring the cup coated with said bonding agent from said applicator station to a machine for assembling the bottle from the cup and from one of said round-bottomed hollow bodies.

14. The method as claimed in claim 13, wherein said applying step includes periodic release of said bonding agent from a position above said operatively rotating cup so as to reach the top surface of the rotating cup.

* * * * *